United States Patent
Marsh et al.

(10) Patent No.: US 7,055,148 B2
(45) Date of Patent: May 30, 2006

(54) SYSTEM AND METHOD FOR UPDATING FIRMWARE

(75) Inventors: James L Marsh, Fort Collins, CO (US); R Scott Holbrook, Bellvue, CO (US); Eugene L Jung, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 405 days.

(21) Appl. No.: 09/732,467

(22) Filed: Dec. 7, 2000

(65) Prior Publication Data

US 2002/0073304 A1    Jun. 13, 2002

(51) Int. Cl.
G06F 9/44 (2006.01)
G06F 9/445 (2006.01)

(52) U.S. Cl. .......................................... 717/172; 713/2
(58) Field of Classification Search ........ 717/168–178; 713/187, 1–3, 201; 714/7
See application file for complete search history.

(56) References Cited

U.S. PATENT DOCUMENTS

| | | | | |
|---|---|---|---|---|
| 5,210,854 A | * | 5/1993 | Beaverton et al. | 717/174 |
| 5,623,604 A | * | 4/1997 | Russell et al. | 717/167 |
| 5,701,492 A | * | 12/1997 | Wadsworth et al. | 717/173 |
| 5,826,015 A | * | 10/1998 | Schmidt | 713/201 |
| 5,859,911 A | * | 1/1999 | Angelo et al. | 713/187 |
| 5,878,256 A | * | 3/1999 | Bealkowski et al. | 713/2 |
| 5,901,225 A | * | 5/1999 | Ireton et al. | 714/7 |
| 6,009,500 A | * | 12/1999 | Rossi | 711/162 |
| 6,031,867 A | * | 2/2000 | Johnson et al. | 375/222 |
| 6,148,387 A | * | 11/2000 | Galasso et al. | 711/203 |
| 6,266,809 B1 | * | 7/2001 | Craig et al. | 717/173 |
| 6,275,931 B1 | * | 8/2001 | Narayanaswamy et al. | 713/2 |
| 6,308,265 B1 | * | 10/2001 | Miller | 713/2 |
| 6,324,692 B1 | * | 11/2001 | Fiske | 717/171 |
| 6,438,688 B1 | * | 8/2002 | Nunn | 713/2 |
| 6,581,157 B1 | * | 6/2003 | Chiles et al. | 713/1 |
| 6,581,159 B1 | * | 6/2003 | Nevis et al. | 713/2 |
| 6,594,723 B1 | * | 7/2003 | Chapman et al. | 711/103 |
| 6,615,404 B1 | * | 9/2003 | Garfunkel et al. | 717/173 |
| 6,640,334 B1 | * | 10/2003 | Rasmussen | 717/171 |
| 6,718,373 B1 | * | 4/2004 | Bearden et al. | 709/220 |
| 6,795,912 B1 | * | 9/2004 | Itoh et al. | 713/2 |

* cited by examiner

*Primary Examiner*—Kakali Chaki
*Assistant Examiner*—Trenton J. Roche

(57) ABSTRACT

A system and a method that uses a software application operable under a current firmware/operating system configuration to install a new firmware version without "compromising" the operating system are presented. The software application may configure a computer system to install a plurality of software fixes configured to enhance functionality under a new firmware/operating system environment after the firmware has been successfully upgraded. Such functionality enhancements may be associated with external peripherals, as well as, input/output circuit cards, processors, and the like. In addition, the software application may configure the computing device to "boot" under the new firmware/operating system environment upon subsequent system initializations. Furthermore, the software application permits the distribution of firmware upgrades via a network. The capability to install firmware remotely permits a system administrator to "push" the new firmware to a plurality of network coupled computing devices, thus avoiding manual intervention at each device.

22 Claims, 10 Drawing Sheets

SYSTEM AND METHOD FOR UPDATING FIRMWARE

FIELD OF THE INVENTION

The present invention generally relates to microprocessor based computing devices, which operate pursuant to program instructions or firmware stored in nonvolatile memory. More specifically, the invention relates to a system and method for enabling a system administrator to remotely deliver firmware updates to a plurality of network coupled computing devices.

BACKGROUND OF THE INVENTION

Microprocessors and memory devices are key elements in computing devices. When power is initially applied to a computing device, a microprocessor attempts to read a particular memory address in a non-volatile memory device to receive preliminary instructions. After reading the preliminary instructions, the microprocessor executes the instructions thereby permitting the computing device to become operational. This process is commonly known as "booting." As a result of a "boot" process, the microprocessor transitions from a non-functional mode to an operational mode upon power initialization by reading and executing essential instructions commonly known as firmware.

The firmware or Basic Input/Output System (BIOS) in a Personal Computer (PC) dictates what the PC can accomplish without accessing programs from a disk storage device. The firmware or BIOS contains all the programming code required to control the keyboard, display monitor, mouse, disk drives, serial communication ports, and a number of miscellaneous functions. The BIOS is typically placed in a read only memory (ROM) integrated circuit device that is included within the PC. This mode of delivering the firmware or BIOS ensures that the BIOS will always be available and will not be damaged by disk failures. It also enables a PC to "boot" itself. After the PC has successfully loaded and executed the BIOS, the PC may then be configured to load an operating system into random access memory (RAM).

An operating system is one of the most important programs on a PC. Most general-purpose computers utilize an operating system for running other programs. Operating systems perform basic tasks, such as recognizing input from the keyboard, sending output to the display monitor, managing directories and files on fixed disks, and controlling peripheral devices such as disk drives and printers. Operating systems provide a software platform on top of which other programs, called applications, may run. Applications are typically written to run on top of a particular operating system. For PCs, disk operating system (DOS), operating system 2 (OS/2), Windows, and Linux are some of the most popular operating systems.

A kernel is the central module of an operating system. It is the part of the operating system that loads first, and it remains in RAM. Because the kernel resides in RAM, it is desirable for the kernel to be as small as possible while still providing all the essential services required by other parts of the operating system and applications. Typically, the kernel is responsible for memory management, process and task management, and disk management.

For large computing systems, the operating system has even greater responsibilities and powers. In this regard, the operating system ensures that different programs and users running at the same time do not interfere with each other. The operating system is also responsible for managing security issues, including authorization for access to the system.

An electrically erasable programmable read only memory (EEPROM) device is a non-volatile memory commonly used for storing firmware used by computing devices in their respective "boot" processes. A flash EEPROM permits its entire memory to be erased in a single step. In recent years, flash EEPROMS having selective erasable/writable memory block addressing capabilities have been used extensively for storing firmware. The flash EEPROM is particularly useful as it allows firmware to be erased and upgraded by an operator without the need to physically remove and replace a ROM integrated circuit chip.

The capability to upgrade the firmware by loading programming code to a flash EEPROM both simplifies the upgrade process and reduces the costs associated with firmware upgrades. The extensive use of flash EEPROMs has also increased the reliability of the computing device, which embodies the EEPROM, because printed circuit board sockets are no longer required to support integrated circuit replacement.

However, the use of flash EEPROMS does not resolve a number of problems inherent in the process of distributing firmware updates. Because of the natural progression of the command hierarchy from firmware to operating system to applications, the firmware cannot be removed or manipulated without compromising the operating system. As a result, manual intervention is still required to install new firmware. Typically, this is accomplished by interrupting the "boot" process via keyboard input prior to the transfer of the operating system into RAM and entering a set of appropriate commands to load a boot image and the new firmware from a storage media compatible with a mobile data storage device (e.g., a CD-ROM, a magnetic tape drive, a floppy disk drive, and the like).

Manual firmware upgrades for networked computing devices are problematic for at least the reason that they may require manual repetitive operation of critical steps at what may amount to a non-trivial number of computing devices. Indeed, the services of a skilled technician is often required to perform firmware updates at each computing device even in the case where the computing devices designated for firmware updates are coupled to the same network.

SUMMARY OF THE INVENTION

In light of the foregoing, the invention relates to a system and a method for utilizing a software application that is operable under the current firmware/operating system configuration for installing new firmware without "compromising" the operating system. A software application in accordance with the present invention may configure a computing device to install a plurality of software fixes for enhancing computing device functionality under a new firmware/operating system environment. In addition, a software application in accordance with the present invention may configure the computing device to "boot" under the new firmware/operating system environment upon subsequent system initializations.

A software application in accordance with the present invention may allow for the distribution of firmware upgrades via a network. The capability to install firmware remotely may permit a system administrator to "push" the new firmware to a plurality of network coupled computing devices, thus avoiding manual intervention at each device.

A computer system in accordance with the present invention may comprise a programmable non-volatile memory, a microprocessor, and a fixed storage device. The microprocessor may be configured to execute instructions from the programmable non-volatile memory in response to a boot request and to controllably write to the programmable non-volatile memory. The fixed storage device contains a boot image and is configured with appropriate instruction code for transitioning at least one microprocessor to an operational mode, wherein the storage device receives a modified set of boot instructions containing all execution code and data necessary to perform a firmware upgrade. After the fixed storage device stores the modified boot image, which may be delivered along with its own set of boot instructions, the fixed storage device or "boot" disk may be configured to apply the modified boot image and boot instructions upon the next microprocessor boot request. The boot image may comprise a complete copy of the present firmware installed on the computer system, as well as, a copy of the new firmware, an install application, and a flash application.

In response to the microprocessor boot request, the install application may direct the microprocessor to apply the copy of the present firmware along with the operating system and the file management system when booting the microprocessor. Next, the install application may instruct the microprocessor to replace the firmware in the non-volatile memory with the new firmware. Having completed the firmware upgrade, the install application may contain the necessary instructions to redirect the microprocessor to use the new firmware in response to subsequent microprocessor boot requests. The install application may also install an operating system along with any software patches that require the new firmware/operating system environment. In addition, the install application may perform a file system clean-up operation on the fixed storage device.

The present invention can also be viewed as providing a method for performing a firmware upgrade via a network. In its broadest terms, the method can be described by the following steps: delivering a firmware install patch containing a modified boot image to a boot disk within a plurality of computer systems on a network; initiating an install application; modifying a system loader to direct a microprocessor to execute instructions from the modified boot image upon a microprocessor boot request; initiating a microprocessor boot that loads instructions in the modified boot image; erasing the firmware stored in the computer system; and writing the new firmware.

Other features and advantages of the present invention will become apparent to one skilled in the art upon examination of the following drawings and detailed description. It is intended that all such additional features and advantages be included herein within the scope of the present invention, as defined by the claims.

BRIEF DESCRIPTION OF THE DRAWINGS

The present invention will be more fully understood from the detailed description given below and from the accompanying drawings of the preferred embodiment of the invention. The components in the drawings are not necessarily to scale, emphasis instead being placed upon clearly illustrating the principles of the present invention. Moreover, in the drawings, like reference numerals designate corresponding parts throughout the several views. While the invention is described in connection with these drawings, there is no intent to limit it to the embodiment or embodiments disclosed therein. On the contrary, the intent is to cover all alternatives, modifications, and equivalents included within the spirit and scope of the invention as defined by the appended claims.

DETAILED DESCRIPTION OF THE PREFERRED EMBODIMENTS

The present invention generally relates to a system and network for upgrading firmware in a computing device. It is significant to note that the system and method of the present invention are presented in association with a particular exemplary implementation using a computer system communicatively coupled to a network. In the particular example presented, which represents a preferred embodiment, a system administration node within the network is used to distribute a firmware patch to machines having a firmware version that is designated for a firmware upgrade. The firmware patch may also be configured to verify that each particular computer system is at an appropriate firmware level to successfully execute the desired firmware upgrade. It will be appreciated that the firmware patch may be configured to successfully upgrade a computer system having a plurality of compatible preceding firmware versions to the new firmware version.

Furthermore, the firmware patch may be self-initiating. In alternative embodiments, the firmware patch may be remotely initiated by a system administrator or other operator. It will be appreciated by those skilled in the art that both the system and the method for upgrading firmware in a computing device in accordance with the present invention may be selectively applied to any number of suitably configured computing devices coupled to the network.

Figure 1:
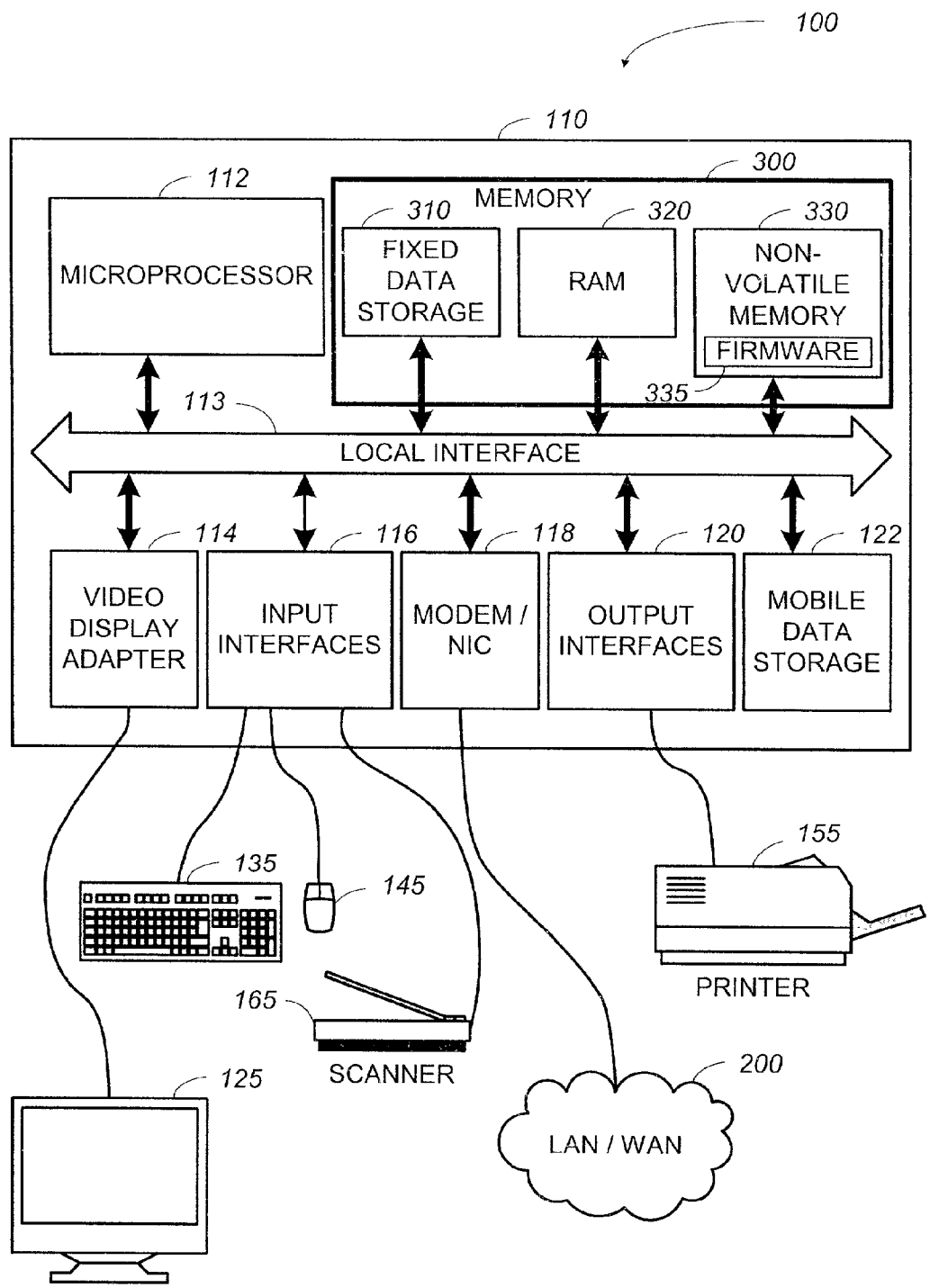
FIG. 1 is a functional block diagram of a computer system with peripheral devices that may be configured to receive, store, distribute, and execute a firmware patch in accordance with the present invention.

Reference is now directed to FIG. 1, which illustrates a computer system with peripheral devices that may be configured to receive, store, distribute, and execute a firmware patch in accordance with the present invention. As shown in FIG. 1, a computer system 100 may comprise a computer 110, a display monitor 125, a keyboard 135, and a mouse 145. As further illustrated in FIG. 1, various peripheral devices may be integrated with the computer 110 to permit other methodologies for transferring information both to and from the computer 110. For example, a printer 155 and a scanner 165 may also be communicatively coupled to the computer 110. In addition, the computer 110 may be coupled to an external network 200 thus allowing the computer 110 to send and receive data via the external network 200 to remote computing devices. As shown, the external network 200 may be a local area network (LAN), a wide area network (WAN), or other similar network.

The computer 110 may comprise a microprocessor 112 and a memory 300 in communication with each other via a local interface 113. The memory 300 may comprise, for example, a fixed data storage device 310, a random access memory (RAM) 320, and a non-volatile memory (ROM) 330. Together the microprocessor 112 and the various memory devices comprising the computer memory 300 (i.e., the fixed data storage 310, RAM 320, and non-volatile memory 330) operate to load firmware 335 to "boot" the computer 110, load an operating system, manage files, and execute programs. As previously described, the firmware 335 controls what the microprocessor 112 can accomplish without accessing programs from a disk storage device (i.e., the fixed data storage device 310 or mobile data storage device 122).

The firmware 335 may contain all the programming code required to control the keyboard 135, display monitor 125, mouse 145, mobile data storage 122, other input/output devices, and a number of miscellaneous functions. In order to ensure that the firmware 335 is always available for the microprocessor 112, the firmware 335 may be stored in the non-volatile memory 330. It is significant to note that the term "volatile" refers to memory devices that generally lose data stored therein upon the loss of power. Thus, a non-volatile memory device refers to a memory device that does not lose stored data upon the loss of power.

After loading the firmware 335, the microprocessor 112 and memory 300 may work together to transfer the operating system from the fixed data storage device 310 to the RAM 320. Once the operating system has been successfully loaded into the RAM 320, the computer 110 may execute application software suited to coordinate data transfers between the RAM 320 and various input/output peripheral interfaces. For example, the computer 110 may further comprise a video display adapter 114, a plurality of input interfaces 116, a modem/network interface card (NIC) 118, a plurality of output interfaces 120, and a mobile data storage device 122, all of which may also be coupled to the local interface 113.

Figure 2:
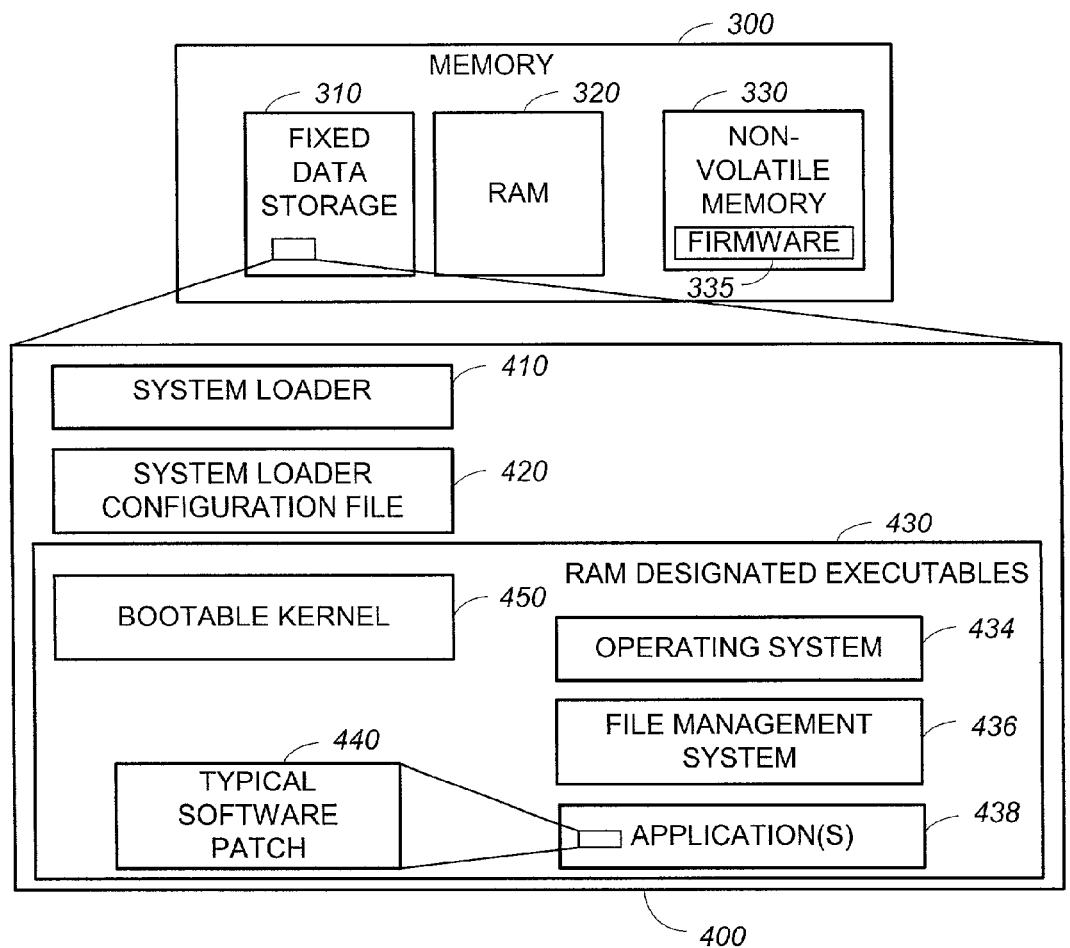
FIG. 2 is a schematic diagram illustrating various items that may be stored within a boot image on the fixed data storage device within the computer system of FIG. 1.

Having generally introduced and described the computer system 100 with regard to FIG. 1, reference is now directed to FIG. 2, which presents a schematic illustrating various items that may be stored on the fixed data storage device 310 within the computer system 100 of FIG. 1. As illustrated in FIG. 2, the memory 300 may comprise a boot image 400 that may be stored on the fixed data storage device 310. The boot image 400 may comprise a system loader 410, a system loader configuration file 420, and a plurality of RAM designated executables 430. As further illustrated in FIG. 2, the RAM designated executables 430 may comprise a bootable kernel 450, an operating system 434, a file management system 436, and applications 438. Each of the aforementioned items comprising the boot image 400 may contain instructions or executable programming code compatible with microprocessor 112 (FIG. 1). As such, the system loader 410, the system loader configuration file 420, the bootable kernel 450, the operating system 434, the file management system 436, and the applications 438, as well as, any other code stored on the fixed data storage device 310 may be identified by a start memory address and an indicator indicative of respective size.

When power is initially applied to the computer 110 (FIG. 1), the microprocessor 112 (FIG. 1) may be supplied power, and in response, may be configured to read particular memory addresses in the non-volatile memory device 330 (e.g., firmware 335) to receive preliminary instructions. Next, the microprocessor 112 (FIG. 1) may execute the firmware instructions thereby permitting the computer 110 (FIG. 1) to become operational. The firmware 335 may contain all the programming code required to control the keyboard 135, display monitor 125, mouse 145, fixed data storage devices 310, input interface 116, and output interface 120, and a number of miscellaneous functions (FIG. 1). Once the firmware 335 is successfully processed by the microprocessor 112 (FIG. 1), the microprocessor 112 may retrieve the boot image 400 from the fixed data storage device 310.

As illustrated in FIG. 2, the boot image 400 for a boot process that does not require a firmware upgrade may proceed as follows. First, the boot image 400 directs the microprocessor 112 (FIG. 1) to the system loader 410. The system loader 410 may be configured to add to the command infrastructure provided by the firmware 335. The system loader 410 may build upon the firmware 335 by supplying instruction code that allows higher-level functionality than that required to interrupt the boot process. In addition, the system loader 410 may be configured to direct the microprocessor 112 (FIG. 1) using data supplied by the system loader configuration file 420. As illustrated in FIG. 2, the system loader configuration file 420 may contain data suited to direct the microprocessor 112 to a plurality of RAM designated executables 430. For example, the system loader configuration file 420 may be configured to direct the microprocessor 112 to load the bootable kernel 450, the operating system 434, the file management system 436, and other applications 438 into RAM 320. By moving a copy of the RAM designated executables 430 into RAM 320, the computer 110 (FIG. 1) optimizes computer system performance by taking advantage of the faster data transfer rates possible with RAM 320 than data transfer rates possible between the microprocessor 112 and the fixed data storage 310.

As further illustrated in FIG. 2, a boot image 400 may contain applications 438 that include a software patch 440. A software patch is an actual piece of object code that is inserted into (or "patched" into) an executable program, such as applications 438. The typical software patch 440 thus becomes a part of the improved application 438 to which it was applied. As a result, the typical software patch 440 together with the improved application 438 rely on the operating system 434, the file management system 436, the bootable kernel 450, the system loader configuration file 420, the system loader 410, and the firmware 335 to supply an appropriate command structure for manipulating data within the computer 110 (FIG. 1).

Often, a software patch 440 will be accompanied by an associated install script, which may contain specific instructions tailored to the particular requirements of the installation. In this context, a script is a file containing a sequence of operating system commands that may also contain means for controlling the sequence of such execution. It is significant to note that an executable program or any other method of directing the computer 110 to perform the necessary tasks may be utilized.

Improved Method for Implementing Firmware Upgrades

Figure 3:
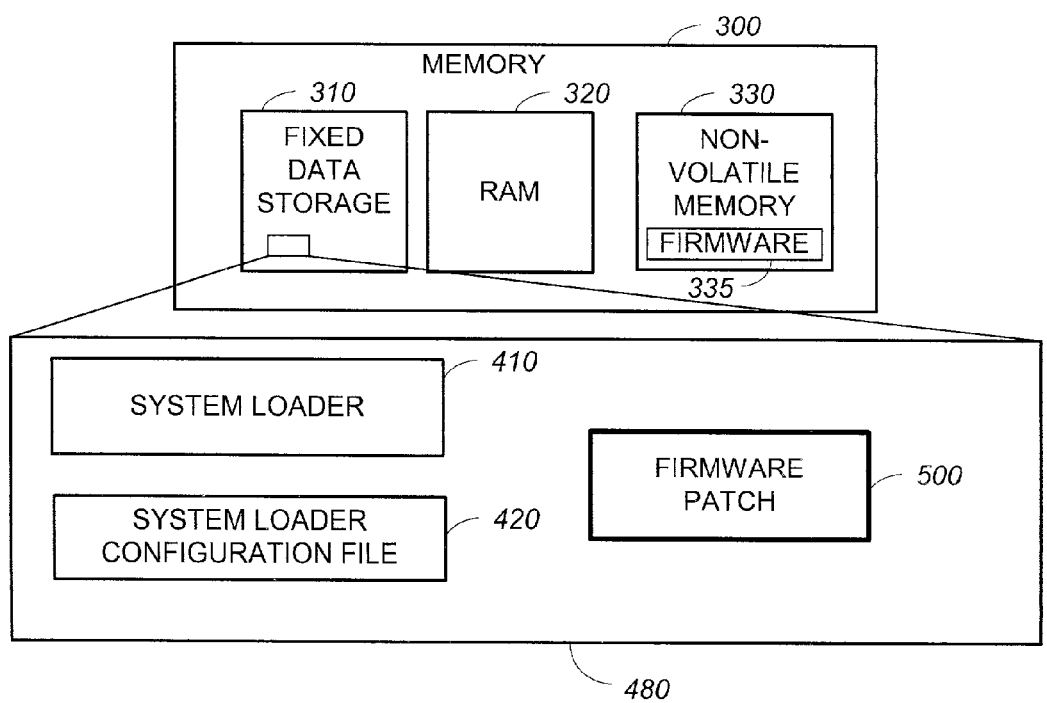
FIG. 3 is a schematic diagram illustrating a modified boot image in accordance with the present invention.

Having described a typical boot process with regard to the manipulation and processing of the various items comprising an exemplary boot image 400 with regard to FIG. 2, reference is now directed to FIG. 3, which presents a modified boot image in accordance with the present invention. As illustrated in FIG. 3, the memory 300 may comprise a modified boot image 480 that may be stored on the fixed data storage device 310. The modified boot image 480 may comprise a system loader 410, a system loader configuration file 420, and a firmware patch 500 in accordance with the present invention.

In a preferred embodiment, the system loader configuration file 420 of the modified boot image 480 may be configured to direct the system loader 410 to execute the firmware patch 500 upon the next boot request. The firmware patch 500 differs from prior art software patches, such as the exemplary typical software patch 440 (FIG. 2) for at least the reason that prior art software patches are reliant upon the current command infrastructure as defined by the present firmware version and operating system. The firmware patch 500 is unique in that it contains the execution code necessary to perform a firmware upgrade. Specifically, the firmware patch 500 contains a bootable kernel, firmware update logic, and a non-volatile memory interface. The bootable kernel may further comprise a system loader interface and reboot logic.

The firmware patch 500 permits a system administrator to distribute a firmware upgrade to a class of machines via a network. In addition, the firmware patch 500 permits a system administrator to "push" the firmware update to a plurality of network connected computer systems simultaneously. Furthermore, the firmware patch 500 can be bundled along with other software patches that may rely on the firmware update. Once the firmware patch 500 has upgraded the firmware 335 within each respective computer system 100 (FIG. 1), the associated executable application may be configured to modify the boot image 480 such that the computer system 100 is programmed to boot in the new firmware/operating system environment rather than repeatedly applying the firmware patch 500 upon each power-up or computer system boot.

Figure 4:
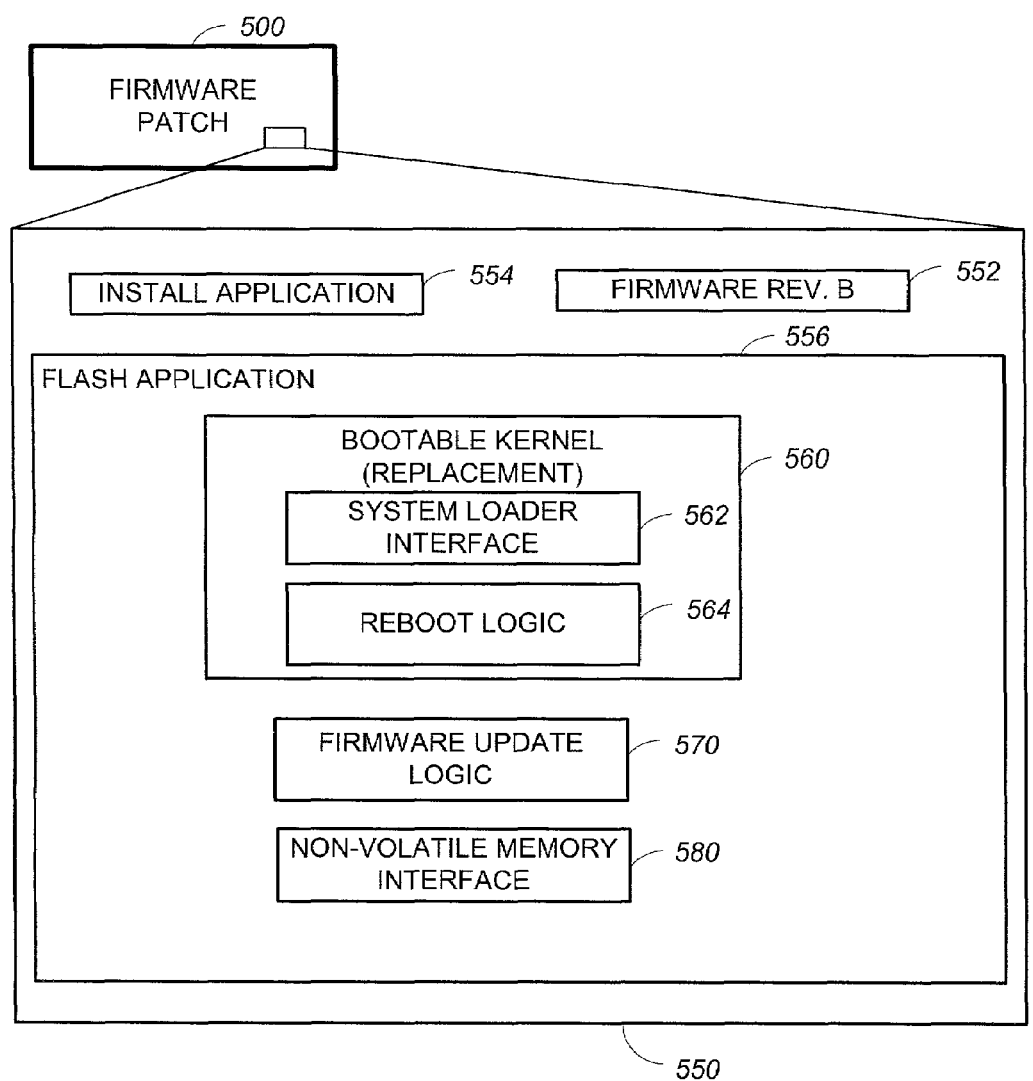
FIG. 4 is a schematic diagram illustrating a firmware patch that may be received, stored, and executed by the computer system of FIG. 1.

Reference is now directed to FIG. 4, which presents a schematic diagram illustrating the various elements comprising the firmware patch 500 of FIG. 3. In this regard, the firmware patch 500 may comprise a patch memory map 550 that may contain all the necessary function code and data to perform the designated firmware upgrade. As illustrated in FIG. 4, the patch memory map 550 may comprise a firmware revision 552, an install application 554, and a flash application 556. As also illustrated in FIG. 4, the flash application 556 may comprise a bootable kernel 560, which may further comprise a system loader interface 562 and a reboot logic 564. The bootable kernel 560, the system loader interface 562, and the reboot logic 564 may be compatible with the underlying firmware presently stored within the nonvolatile memory 330 (FIG. 3) on the computer system 100 (FIG. 1).

In a preferred embodiment, the install application 554 may be configured to load the bootable kernel 560, the system loader interface 562, and the reboot logic 564 from the flash application 556 on the fixed data storage device 310 or "boot" disk. As previously described, the modified boot image 480 (FIG. 3) may comprise the firmware patch 500, which may comprise the modified memory map 550. The install application 554 may also be configured to direct the system loader 410 to load the firmware patch 500 and guide the computer 110 (FIG. 1) through the firmware upgrade boot process. Once the computer 110 is operative in a mode that is compatible with the presently installed firmware 335, the flash application 556 may verify that the presently installed firmware 335 is indeed a version that is designated for the firmware upgrade. If it is determined that the present firmware version is suited for the upgrade, the flash application 556 may be configured to replace the contents of the non-volatile memory device 330 with the firmware revision 552. Next, the install application 554 may include code necessary to apply an upgraded operating system, software patches, and other application programs compatible with the new firmware (i.e., the firmware revision 552). Last, the install application 554 may include code to load a suitable boot image for the new command environment. This may include the necessary instruction for directing subsequent boot processes to the boot image for the new command environment and for removing the firmware revision 552 and the flash application 556 from the boot disk.

Figure 5:
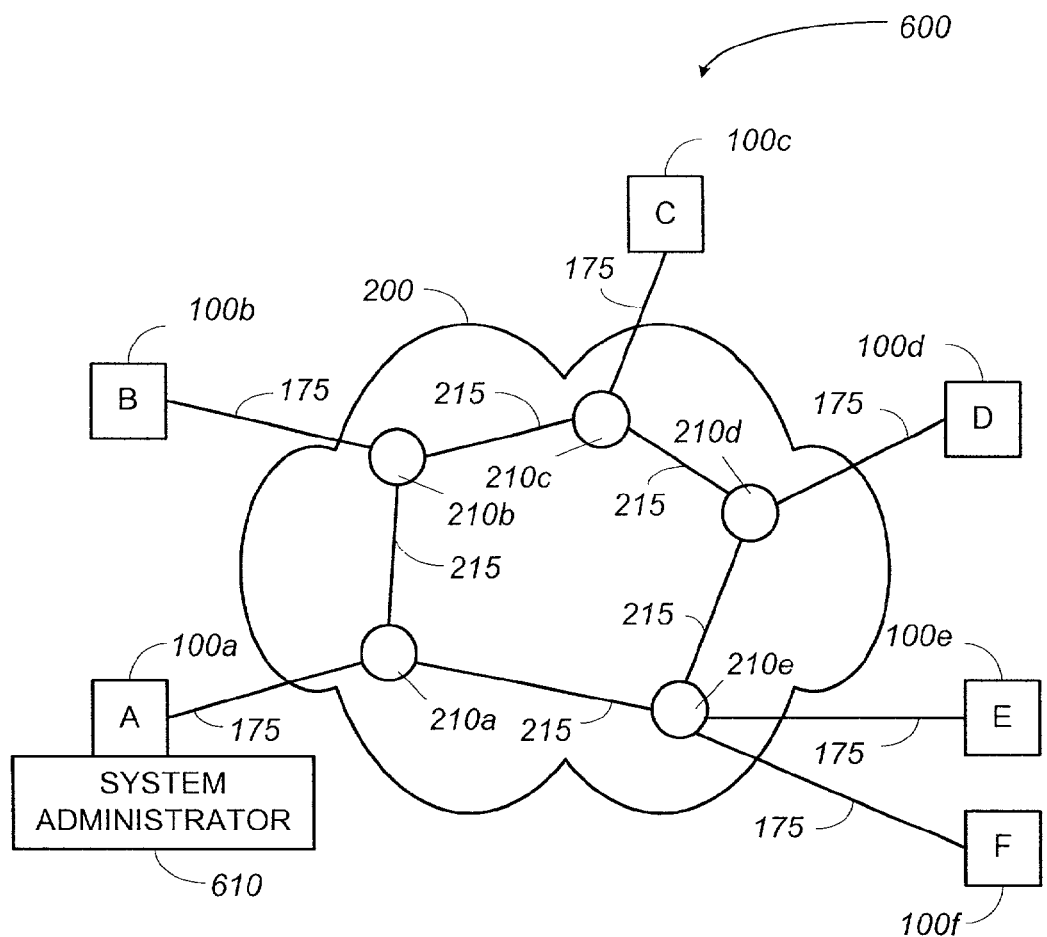
FIG. 5 is a schematic diagram illustrating an exemplary network configuration that may be used to distribute and execute the firmware patch of FIG. 4.

Reference is now directed to FIG. 5, which presents a schematic diagram illustrating an exemplary network configuration that may be used to distribute and execute the firmware patch 500 of FIG. 4. In this regard, FIG. 5 illustrates a network environment 600 that uses a plurality of nodes to transfer data to and from a plurality of computing devices. More specifically, the network environment 600 comprises a plurality of workstations 100a–100f, herein labeled, "A," "B," "C1" "D," "E," and "F" in communication with each other via communication links 175 and a network 200. Each of the workstations 100a–100f may be configured identical to the workstation 100 illustrated in FIG. 1. As illustrated in FIG. 5, the network 200 comprises a plurality of nodes 210a–210e in communication with each other via a plurality of network communication links 215. It will be appreciated that the network communication links 215 may comprise a plurality of singular or grouped Ethernet, T1, T3, E1, E3, synchronous optical network (SONET) or other data network communication links. As illustrated, the network 200 may comprise a plurality of nodes 210a–210e.

As also illustrated in FIG. 5, the network 200 may be configured in a ring configuration such that either of two different physical pathways formed by the various network communication links 215 may be traversed by data transfers between any of the various workstations 100. For example, data originating from workstation 100a, herein labeled "A," may be communicated along a first communication link 175 to a first node 210a. As shown, node 210a may be in communication with two other nodes 210b and 210e. As a result of the network structure illustrated in FIG. 5, each of the workstations 100b, 100c, 100d, 100e and 100f may receive data originating from workstation 100a via the network 200 and the various communication links 175 that interconnect each of the workstations 100 to a network node 210.

In a well-known manner, data originating at computer system 100b and suitably configured to designate computer system 100d as its destination may be transmitted along communication link 175 to network node 210b of the network 200. Network node 210b may then use information contained within the data to identify the network node associated with a designated destination computer system. In the case of computer system 100d, the appropriate destination node is network node 210d. Those skilled in the art will appreciate that the data may traverse the network 200 via the path identified by network nodes 210b, 210c, and 210d. Alternatively, the data may traverse network nodes 210b, 210a, 210e, and 210d.

Having been properly transferred from a first or source network node 210b to a second or destination network node 210d within the network 200, the data may then be transmitted from the second network node 210d via the communication link 175 to the designated destination computer system 100d. It will be appreciated that the network environment 600 may be used to transmit video, voice, and text data between each of the interconnected computer systems 100a–100f. It will be further appreciated that the network environment 600 may comprise bi-directional communication links 175 and bi-directional network nodes 210a–210e to permit simultaneous video, voice, and text data transfers to and from each of the computer systems 100a–100f coupled to the network 200. As a result, it is possible to configure the firmware patch 500 of the present invention to provide suitable feedback to a system administrator 610 that "pushes" the firmware upgrade to a plurality of networked computer systems 100b–100f to indicate the status of the firmware upgrade. For example, if the flash application 556 determines that the presently installed firmware on computer system 100e is not suited for the current firmware patch 500, the flash application 556 may be configured to report accordingly to a suitably configured firmware upgrade database status application (not shown) executing at computer system 100a on the network 200. Similarly, if the firmware upgrade has been successfully installed, each of the upgraded computer systems 100b–100f may be configured to report the same to the firmware upgrade status application.

It is significant to note that the network 200 is presented for simplicity of illustration and description, with a limited number of network nodes 210a–210e and network communication links 215. Those skilled in the art will appreciate that, in more practical configurations, a network 200 may comprise any number of network nodes 210a–210e and network communication links 215 necessary to communicatively couple remotely located computer systems 100a–100f.

Figure 6:
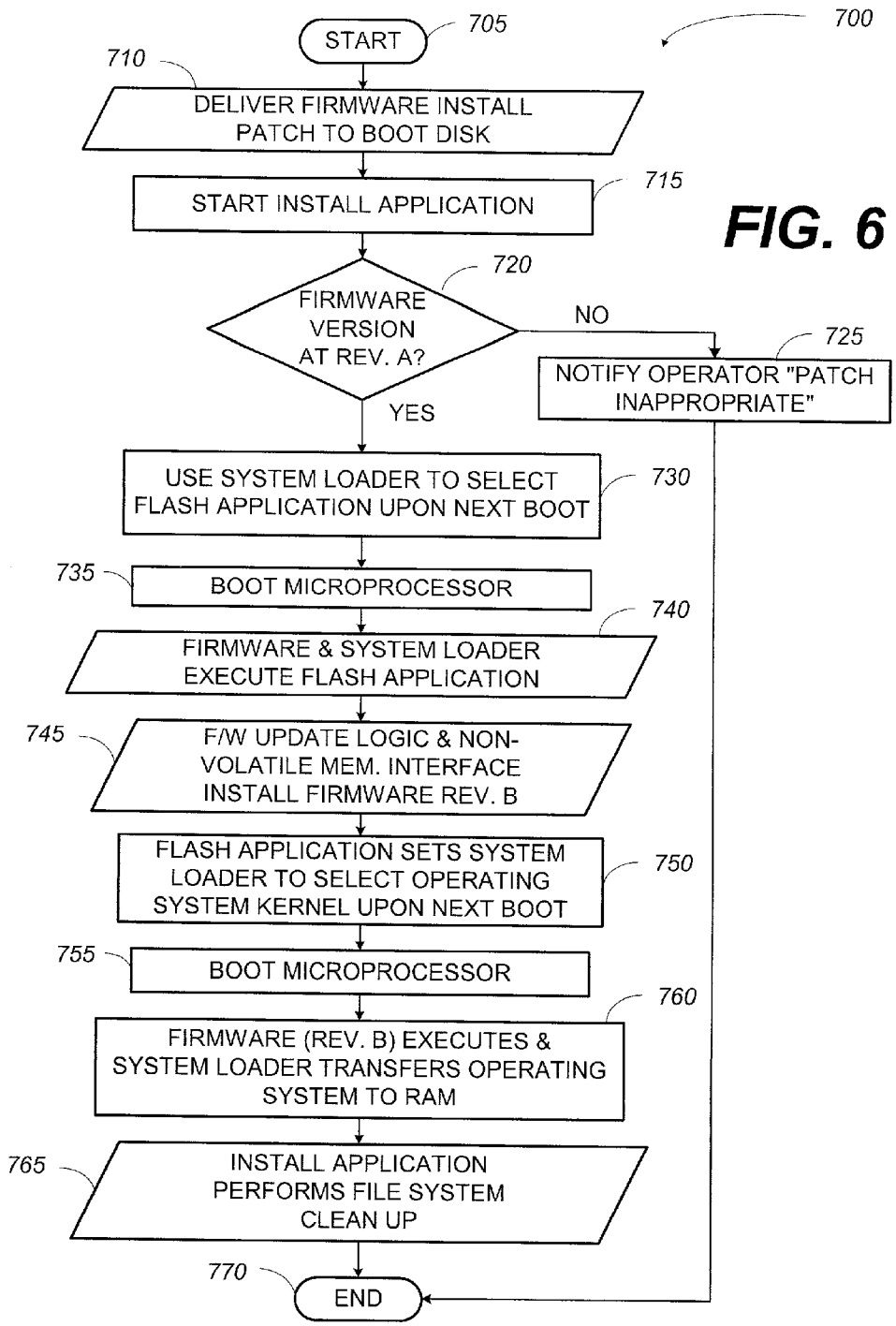
FIG. 6 is a flowchart illustrating a method for delivering and installing firmware upgrades that may be practiced via a computer system coupled to the network of FIG. 5.
Figure 7A:
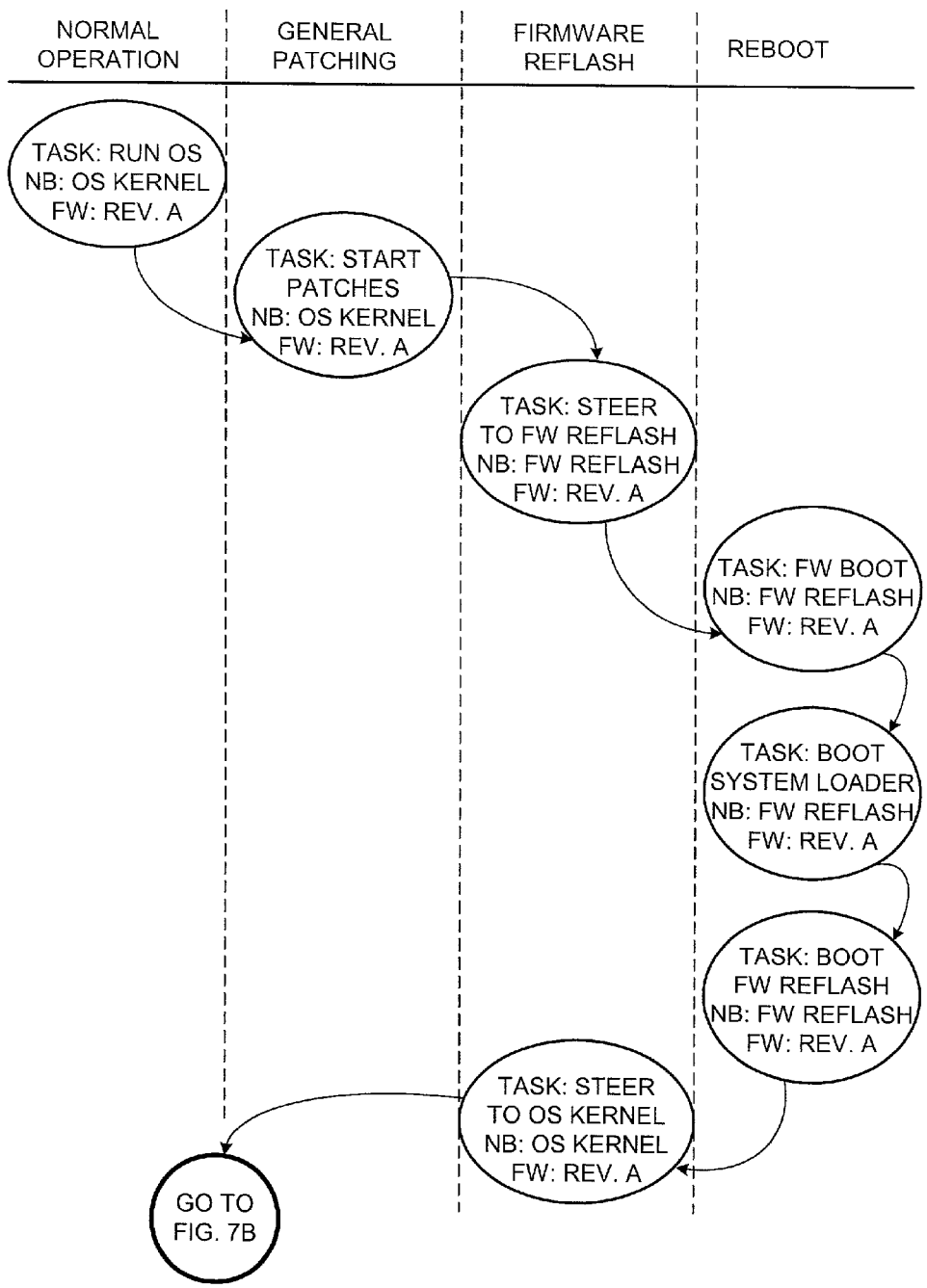
FIGS. 7A–7D present a schematic diagram illustrating an exemplary state table that further details a firmware upgrade in accordance with the present invention.
Figure 7B:
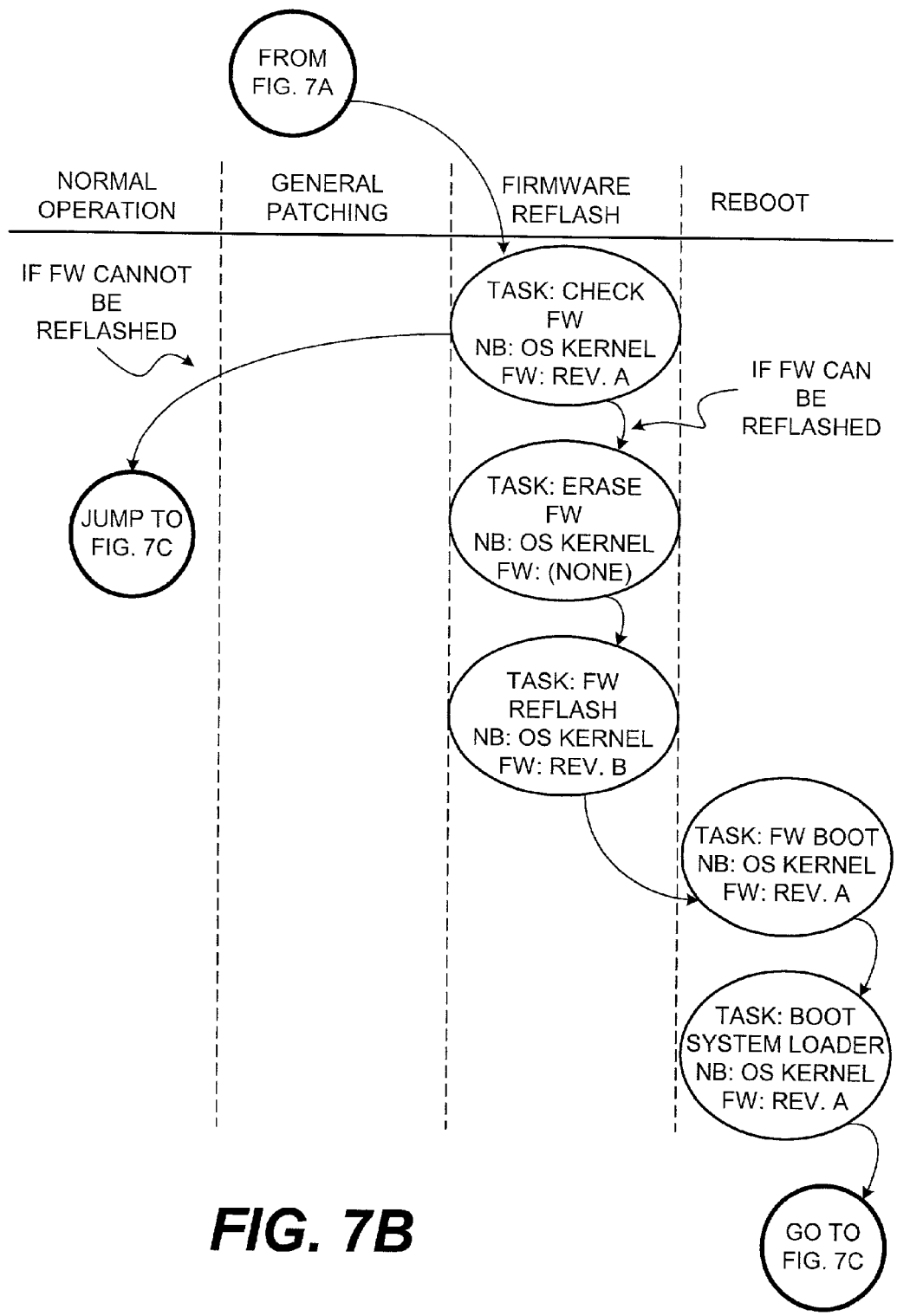
Figure 7C:
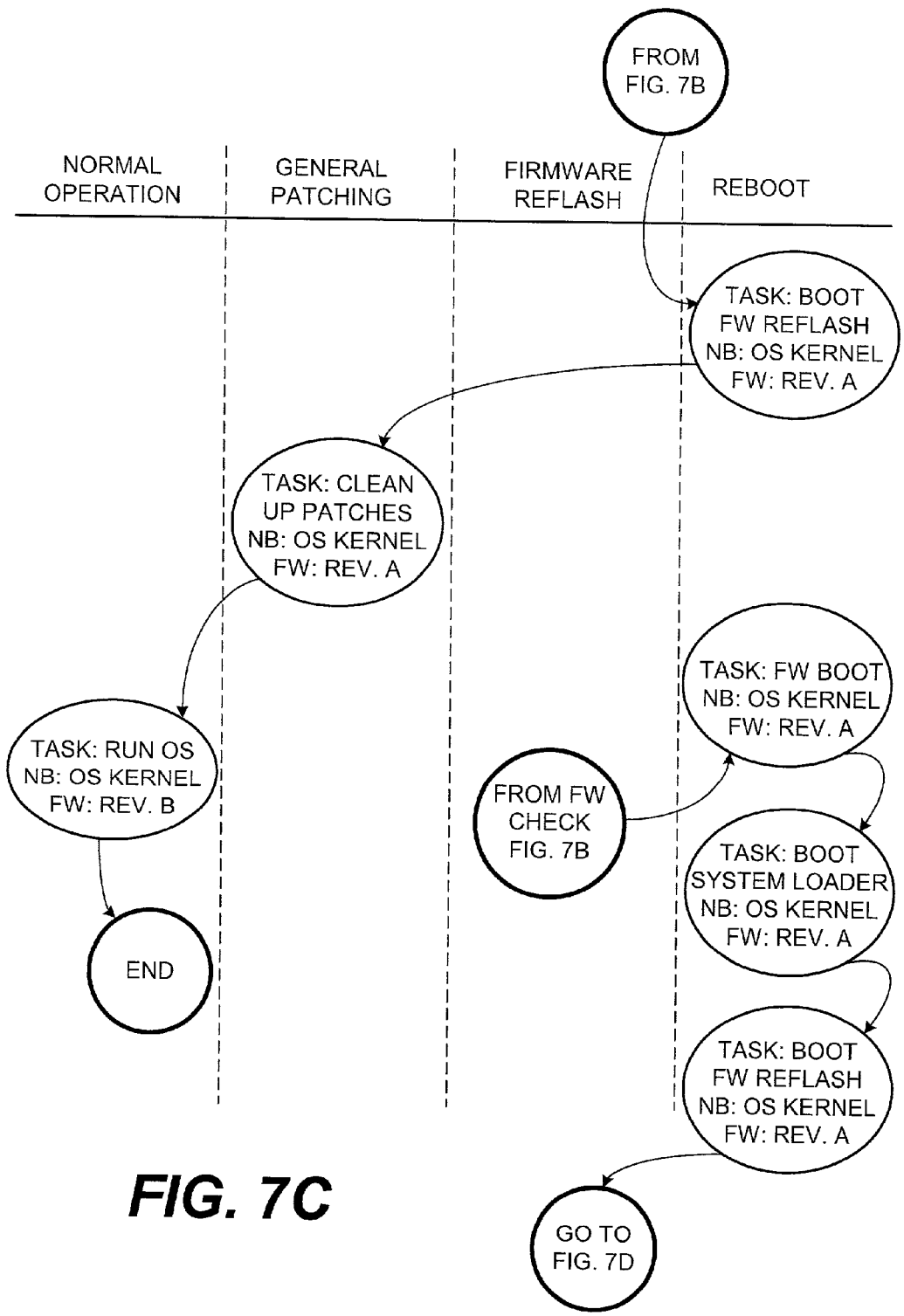
Figure 7D:
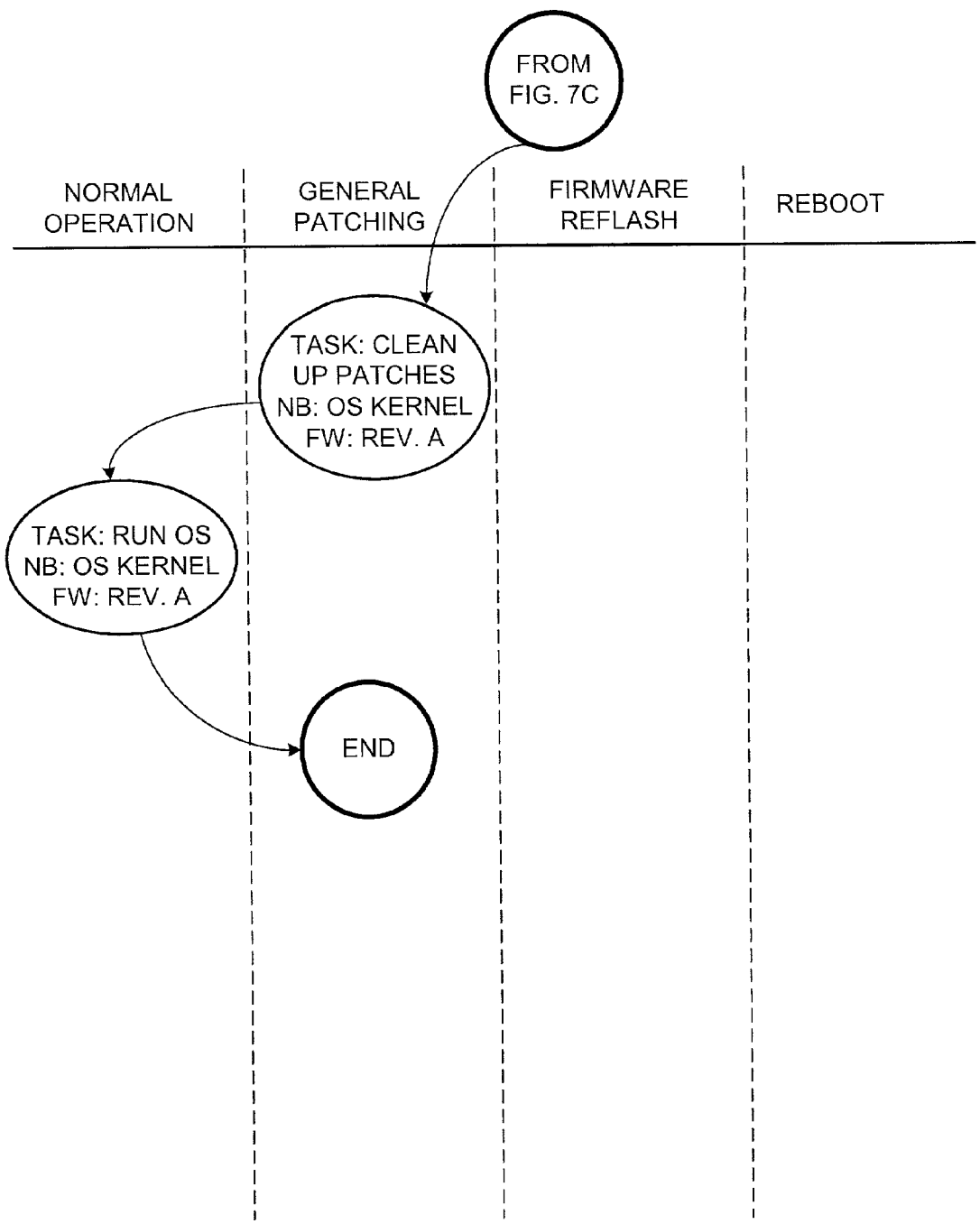

Having briefly described a network environment 600 (FIG. 5), which may support remote application of the firmware patch 500, reference is now directed to FIG. 6, which illustrates a method for delivering and installing firmware upgrades that may be practiced via a workstation coupled to the network of FIG. 5. As illustrated in FIG. 6, a method for performing firmware upgrades 700 may begin with step 705, herein labeled, "Start." Next, as indicated in step 710, the method for performing firmware upgrades 700 may deliver a firmware install patch to a boot disk on each workstation 100 (FIG. 1) that is designated to receive the firmware upgrade. Once the firmware install patch has been stored on the boot disk within a workstation 100 (FIG. 1), the install application 554 (FIG. 4) may be initiated as shown in step 715. The method for performing firmware upgrades 700 may continue by performing a verification of the firmware version presently operative on the respective workstation 100, as indicated in the query of step 720. If the determination in step 720 is negative, the method for performing firmware upgrades 700 may be configured to notify an operator that the presently installed firmware is incompatible with the intended firmware upgrade as shown in step 725. Having notified the operator, the method may proceed to terminate, as indicated by the flowchart of FIG. 6.

Otherwise, if the determination in step 720 is affirmative, the method for performing firmware upgrades may continue by performing step 730 where the system loader 410 (FIG. 3) may be configured to select the flash application 556 (FIG. 4) upon the next boot of the computer system 100 (FIG. 1). Next, the install application 554 (FIG. 4) may trigger a boot of the microprocessor 112 (FIG. 1) as indicated in step 735. With the flash application 556 (FIG. 4) designated in the modified boot image 550 (FIG. 4), the method for performing a firmware upgrade 700 may proceed by executing the flash application 556 (FIG. 4) as shown in step 740. With the computer system appropriately configured to allow the microprocessor 112 (FIG. 1) to install the firmware upgrade into the non-volatile memory device 330 without compromising the operating system, the method may now use the firmware update logic 570 and the non-volatile memory interface 580 from the flash application 556 (FIG. 4) to load the new firmware as shown in step 745. As illustrated in step 750, the method for performing firmware upgrades may use the flash application 556 (FIG. 4) to select the operating system 434 (FIG. 2) upon the next boot of the computer system 100 (FIG. 1).

Having installed the firmware revision 552 (FIG. 4) in the non-volatile memory device 330 of the computer system 100 (FIG. 1) in step 745, and reset the system loader configuration file 420 (FIG. 2) to select the operating system kernel for transfer into RAM 320 (FIGS. 1–3), the install application 554 (FIG. 4) may be configured to boot the microprocessor as indicated in step 755. As further illustrated in step 760 of the flowchart of FIG. 6, the method for performing firmware upgrades 700 may be configured to pause while the newly installed firmware revision 552 (FIG. 4) executes and the reconfigured system loader 410 transfers the operating system kernel into RAM 320 (FIGS. 1–3). Once the boot process has completed, the method for performing firmware upgrades 700 may be configured to clean up the file system by removing the flash application 556 and the firmware revision 552 from the on the fixed storage data device 310 (FIG. 1), as illustrated in step 765. The method for performing firmware upgrades 700 may then terminate as indicated in step 770 herein labeled, "End."

Any process descriptions or blocks in the flowchart of FIG. 6 should be understood to represent modules, segments, or portions of code which include one or more executable instructions for implementing specific logical functions or steps in the process for performing firmware upgrades 700. Alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It will be appreciated that the methods for performing firmware upgrades 700 in accordance with the present invention may comprise an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable media would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Reference is now directed to FIGS. 7A–7D, which present a schematic diagram illustrating an exemplary state table that further details a firmware upgrade in accordance with the present invention. In this regard, the state table may be characterized by a plurality of state types as labeled generally across the top of each of the FIGS. 7A–7D. As shown in FIGS. 7A–7D, the state types may comprise normal operation (i.e., normal operation of a computer 110), general patching (i.e., operations using a high level patch application that typically include an install script), firmware reflash, and reboot operations.

Normal operation may comprise running various applications that have been loaded into RAM 320 (FIGS. 1–3) from the fixed storage device 310 (FIGS. 1–3). General patching operations may comprise network and file system manipulations to modify RAM designated executables 430 (FIG. 2). Firmware reflash operations, on the other hand, may comprise non-volatile memory 330 manipulations (e.g., erasing and writing). Finally, reboot operations may comprise tasks associated with identifying a source for data instructions to be used when initializing the computer 110 (FIG. 1). For example, the firmware 335 (FIGS. 1–3), the modified boot image 480 (FIG. 3), or the fixed data storage device 310 (FIGS. 1–3).

As illustrated in FIGS. 7A–7D, each of the states in the state table may be identified by a task (TASK), a variable indicating the next boot source (NB), and a variable indicating the firmware version (FW) present in the non-volatile memory device 330 (FIGS. 1–3). It will be appreciated by those skilled in the art that the progression through the various states illustrated in FIGS. 7A–7D is by way of example only. In fact, multiple variations are possible (i.e., a number of states may be encountered out of the exemplary order presented) all such variations are deemed within the scope of the preferred embodiment of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. For example, it will be appreciated by those skilled in the art that portions of code which include one or more executable instructions for implementing specific logic functions or steps in the process for performing firmware upgrades 700 may be implemented in hardware. If implemented in hardware, as in an alternative embodiment, the method for performing firmware upgrades 700 may be implemented with any, or a combination, of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. All such modifications and variations are intended to be included herein within the scope of the present invention and protected by the following claims.

Therefore, having thus described the invention, at least the following is claimed:

1. A computer system communicatively coupled to a network, comprising:
   an operating system;
   a programmable non-volatile memory;
   at least one microprocessor operatively coupled to execute at least one instruction from the programmable non-volatile memory in response to a boot request, the microprocessor configured to controllably write to the programmable non-volatile memory; and
   at least one fixed storage device operatively coupled to the at least one microprocessor, wherein the at least one fixed storage device receives from the network at least a portion of a boot image comprising:
      a system loader;
      a firmware patch;
      a configuration file modifiable to direct the system loader to execute the firmware patch instead of the operating system in response to a subsequent boot request; and
      the firmware patch configured to write a firmware upgrade to the programmable non-volatile memory, the firmware patch comprising:
         an install application;
         a firmware revision containing at least one instruction different from firmware within the programmable non-volatile memory; and
         a flash application having a bootable kernel, firmware update logic, and a non-volatile memory interface, wherein the firmware update logic is executable on the microprocessor to write the firmware revision to the programmable non-volatile memory.

2. The computer system of claim 1, wherein the at least one fixed storage device receives and stores new firmware.

3. The computer system of claim 1, wherein the at least one fixed storage device receives and stores an application.

4. The computer system of claim 1, wherein the bootable kernel comprises a system loader interface and reboot logic.

5. The computer system of claim 4, wherein the bootable kernel comprises an operating system.

6. The computer system of claim 4, wherein the bootable kernel comprises a file management system.

7. A computer network, comprising:
   a plurality of computer systems communicatively coupled to a network infrastructure, each of the plurality of computer systems configured with a non-volatile memory containing a common firmware version designated for replacement and a fixed storage device containing a boot image having appropriate instruction code suited to transition the respective computer system to an operational mode;
   a user input device communicatively coupled to at least one computer system communicatively coupled to the network infrastructure, the at least one computer system configured with write access permission for the respective fixed storage device associated with each of the plurality of computer systems, wherein an input from the user input device initiates a transfer of a modified boot image to the plurality of computer systems, the modified boot image comprising a revised firmware, a configuration file, an install application, and a firmware patch having a bootable kernel different from an operating system operable on the respective computer system, the configuration file modifiable to select the firmware patch instead of the operating system for execution on a next boot, the install application executable in the respective computer system to verify whether the revised firmware is able to successfully upgrade the common firmware version.

8. A method for performing a firmware upgrade, comprising:
delivering, over a network, a firmware install patch containing new firmware, an install application, a configuration file, and a flash application to boot disks within respective plurality of networked computer systems, each of said computer systems having a version of a firmware designated for the firmware upgrade, wherein the flash application comprises a bootable kernel, firmware update logic, and a non-volatile memory interface;
initiating the install application contained within the firmware install patch;
modifying the configuration file in the firmware install patch to direct a system loader to execute the firmware install patch instead of an operating system in each computer system in response to a subsequent microprocessor reset;
initiating a microprocessor reset;
executing the flash application in response to the initiated microprocessor reset;
erasing, by the firmware update logic, the firmware within each of the plurality of networked computer systems in response to execution of the flash application; and
writing, by the firmware update logic, the new firmware to each of the plurality of networked computer systems in response to execution of the flash application in each of the plurality of networked computer systems.

9. The method of claim 8, wherein the delivered firmware install patch comprises at least one executable configured to verify the version of the firmware stored in the computer system prior to writing the new firmware.

10. The method of claim 8, further comprising:
installing an operating system that requires the new firmware;
installing a software patch that requires the new firmware;
resetting the configuration file to redirect the system loader to select the appropriate memory address upon a subsequent microprocessor reset to apply the upgraded firmware, operating system, and software patch; and
removing the firmware install patch from the computer system.

11. A computer system communicatively coupled to a network, comprising:
a programmable non-volatile memory having a first firmware;
at least one microprocessor operatively coupled to controllably write to the programmable non-volatile memory and execute at least one instruction from the programmable non-volatile memory in response to a boot request; and
at least one fixed storage device operatively coupled to the at least one microprocessor, the storage device containing a firmware patch and a configuration file configurable to select the firmware patch for execution on a next boot, the firmware patch comprising:
an install application;
a second firmware different from the first firmware; and
a flash application comprising:
a bootable kernel including a system loader interface and reboot logic;
a firmware update logic; and
a non-volatile memory interface to enable the firmware update logic to upgrade the first firmware in the programmable non-volatile memory with the second firmware,
the install application executable on the microprocessor to verify whether the second firmware is able to successfully upgrade the first firmware.

12. The computer system of claim 11, further comprising a system loader to execute the flash application upon the next boot based on the configuration file.

13. The computer system of claim 11, wherein the firmware update logic and the non-volatile memory interface store the second firmware on the non-volatile memory.

14. The computer system of claim 11, wherein upon the occurrence of a next boot after updating the first firmware with the second firmware, the second firmware and a system loader transfer an operating system to a random access memory communicatively coupled to the at least one microprocessor.

15. The computer system of claim 11, wherein the install application executes a file system operation.

16. The computer system of claim 15, wherein the file system operation results in the removal of the firmware patch from the at least one fixed storage device.

17. The computer system of claim 1, wherein the install application resets the configuration file in the boot image to select the operating system to execute on a subsequent boot after writing of the firmware revision.

18. The computer system of claim 1, wherein the firmware patch is executable on the microprocessor to verify whether the firmware revision can successfully upgrade the firmware within the programmable non-volatile memory.

19. The computer system of claim 18, wherein the firmware patch is executable on the microprocessor to report to a remote system whether the firmware revision can successfully upgrade the firmware within the programmable non-volatile memory.

20. The method of claim 8, further comprising resetting the configuration file to direct the system loader to execute the operating system in each computer system upon a next microprocessor reset after writing the new firmware.

21. The computer system of claim 11, wherein the configuration file is resettable to enable execution of the operating system in response to a next boot after updating the first firmware with the second firmware.

22. The computer system of claim 11, wherein the fixed storage device further stores a boot image, the boot image containing the firmware patch and configuration file.

* * * * *